Oct. 13, 1970   J. K. TUNIS III   3,533,668

REINFORCED PLASTIC BEARING AND METHOD FOR FABRICATING SAME

Filed Feb. 19, 1968

JOSEPH K. TUNIS III
INVENTOR

United States Patent Office 3,533,668
Patented Oct. 13, 1970

3,533,668
REINFORCED PLASTIC BEARING AND METHOD FOR FABRICATING SAME
Joseph K. Tunis III, South Bend, Ind., assignor to Plas-Steel Products, Inc., Walkerton, Ind., a corporation of Indiana
Filed Feb. 19, 1968, Ser. No. 706,422
Int. Cl. F16c 33/00
U.S. Cl. 308—238                                              8 Claims

ABSTRACT OF THE DISCLOSURE

A reinforced plastic bearing comprising a lamina of tetrafluoroethylene-cotton threads disposed in resin filled with finely divided particles of tetrafluoroethylene, the resin impregnating the cotton fibers of the threads. Preferably, the lamina is in the form of a tube to provide an inner peripheral bearing surface. The method of this invention comprises the steps of arranging a plurality of tetrafluoroethylene-cotton threads to form a tube, flooding the tube with a resin in liquid state loaded with finely divided particles of tetrafluoroethylene in substantially homogeneous suspension until the cotton fibers of the threads and the interstices in the body of the tube are thoroughly impregnated with the resin suspension, and curing the resin to produce a solid, tubular body of resin presenting an inner, peripheral surface largely composed of tetrafluoroethylene, partly in the form of the tetrafluoroethylene fibers of the embedded threads and partly in the form of the particles of tetrafluoroethylene dispersed through the resin mass.

BACKGROUND OF THE INVENTION

Field of the invention

The present invention relates generally to reinforced plastic bearings and a method for making same, and more particularly to the provision of a reinforced plastic bearing comprising a lamina of tetrafluoroethylene-cotton threads disposed in a resin body, the resin including therein finely divided particles of tetrafluoroethylene. These particles of tetrafluoroethylene and the tetrafluoroethylene in the threads of the lamina provide a multitude of miniature bearing surfaces which are secured in the resin.

Description of the prior art

Reinforced plastic bearings are known. See, for instance, Shobert Pat. 3,131,979 issued May 5, 1964.

Such plastic bearings are conventionally used to support the shafts of small electric motors and do not require oil or the like for lubrication.

A plastic material, tetrafluoroethylene (Teflon), is an excellent bearing material from the standpoints of both lubricity and wear. However, a solid or substantially solid tetrafluoroethylene bearing is dimensionally unstable in that it deforms under load since it possesses, as do other materials, a certain flow which causes the structure to change shape when loads are applied thereto. Additionally, tetrafluoroethylene is quite expensive.

The above-mentioned Shobert patent discloses a bearing structure composed entirely of plastic or resinous material having as a filler a lamina of composition tetrafluoroethylene-cotton thread and a lamina of glass thread as a backing therefor. This tetrafluoroethylene-cotton thread is composed of the staple fibers of cotton and staple fibers of tetrafluoroethylene which are physically interlocked and twisted together into a unitary thread. The resin does not wet the tetrafluoroethylene, but does wet the cotton and does wholly or partially encapsulate the tetrafluoroethylene fibers, thereby forming a matrix securing the tetrafluoroethylene fibers in position. Before the resin is applied, the tetrafluoroethylene-cotton threads are arranged about a mandrel to form a tube defining an inner peripheral bearing surface.

The bearing disclosed in the Shobert Pat. 3,131,979 is ideal for use as a "static" bearing; i.e., a bearing for use with low speed shafts. In contrast, the present invention is characterized as a "dynamic" bearing because it is ideally suited for use with high speed shafts. The major difference between the bearing of the present invention and the bearings of the prior arts resides in the use of a resin highly loaded with a filler of particulate tetrafluoroethylene, having a particle size of approximately one micron or less.

SUMMARY OF THE INVENTION

The present invention comprises both a reinforced plastic bearing and a method for making a reinforced plastic bearing. The bearing of the present invention comprises a lamina of tetrafluoroethylene-cotton threads disposed in resin filled with finely divided particles of tetrafluoroethylene, which resin impregnates the cotton fibers and embeds the tetrafluoroethylene fibers.

The tetrafluoroethylene-cotton threads comprise the staple fibers of tetrafluoroethylene and cotton twisted together, the fibers being discontinuous throughout the thread length. Preferably, the lamina of tetrafluoroethylene-cotton threads is arranged in tubular form to provide an inner peripheral bearing surface in which to journal a shaft. Further, preferably, the tetrafluoroethylene-cotton threads are helically braided, a first portion of the threads extending in the form of a helix in one circumferential direction and a second portion of the threads extending in the form of a helix in the opposite circumferential direction alternately over and under the first portion threads. Still further, preferably, a lamina of braided glass fibers sheathing the lamina of tetrafluoroethylene-cotton threads is provided, this lamina of glass fibers also being impregnated by a resin.

The method of the present invention comprises the steps of arranging a plurality of tetrafluoroethylene-cotton threads to form a tube defining an inner peripheral bearing surface, flooding the threads with a resin material including finely divided and evenly dispersed particles of tetrafluoroethylene, and curing the resin material.

The bearing of the present invention possesses the characteristics of excellent wear, low friction, and dimensional stability, and, yet is economical. The tetrafluoroethylene fibers in the tetrafluoroethylene-cotton threads plus the finely divided particles of tetrafluoroethylene in the resin provide a highly lubricious surface for journaling a shaft. The dimensional stability of the bearing is assured by sheathing the lamina of tetrafluoroethylene-cotton threads in the filled resin in a lamina of helically wound glass fibers which are also disposed in resin.

It is an object of the present invention, therefore, to provide a bearing having as one of its constituents the lubricious plastic material tetrafluoroethylene in a structure which satisfies the requirements of wear-life, lubricity, dimensional stability, economy and compression strength.

Another object of this invention is to provide such a bearing structure which has as one of its elements a thread composed of the staple fibers of both cotton and tetrafluoroethylene so interlocked together as to provide a lubricious bearing surface plus a binding resin material including finely divided particles of tetrafluoroethylene, which resin impregnates the interlocked fibers of cotton and surrounds and embeds the tetrafluoroethylene fibers.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings wherein.

DESCRIPTION OF THE PREFERRED EMBODIMENTS

Figure 1:
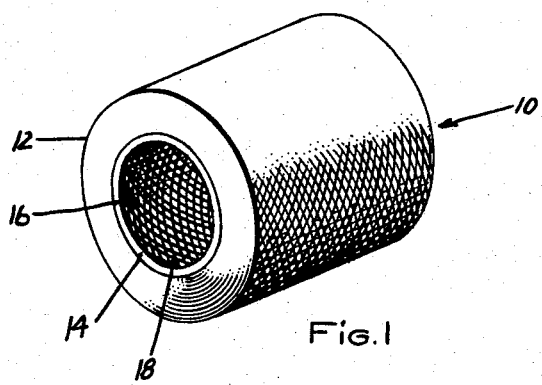
FIG. 1 is a perspective illustration of a bearing embodying this invention.

Referring to the drawings, the bearing is fabricated of essentially the same materials as are conventionally used in glass-reinforced plastic fishing rods and the like. As an exception to this, however, the lamina of tetrafluoroethylene-cotton thread is uniquely arranged in the bearing and is combined with the glass-reinforced plastic as will be described in more detail hereinafter.

Figure 2:
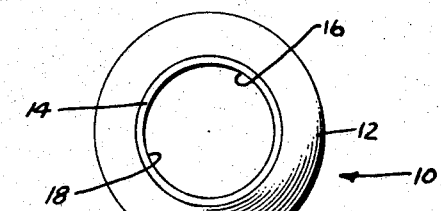
FIG. 2 is an end view thereof.
Figure 3:
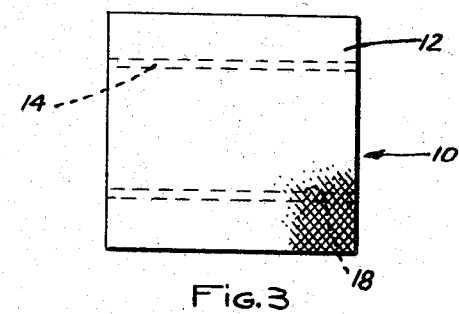
FIG. 3 is a side view thereof.

As shown in FIGS. 1, 2 and 3, the cylindrical bearing indicated generally by the reference numeral 10 is composed of essentially two bonded laminae 12 and 14 which are tubular in shape and coaxial in position. Also, these bonded laminae are contiguous with each other and uniquely assembled into a unitary, compact structure.

The tubular lamina 14 is constituted primarily of a tetrafluoroethylene-cotton thread in the form of a helical braid, the thread being at a single 2⅝ run size of about 4,200 yards per pound. Further, the thread is preferably composed of the staple fibers of cotton and tetrafluoroethylene which are physically interlocked and twisted together into a unitary thread. The proportion of tetrafluoroethylene and cotton is preferably about half and half, there being a multiplicity of tiny fibers approximately three inches long constituting the tetrafluoroethylene and fibers of cotton about one and one-half inches long constituting the cotton component.

The particular twisted thread of staple fibers is in distinct contrast with continuous monofilament thread, the twisted thread providing a better and homogeneous distribution of tetrafluoroethylene material throughout the body of the thread than is possible with a monofilament thread. This twisted thread is fabricated by means of conventional equipment wherein wire brushes comb the short, discontinuous fibers into a common direction, the fibers then being twisted together into formation of the final thread.

Figure 4:
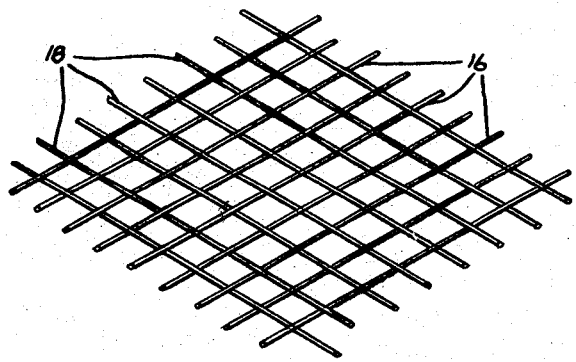
FIG. 4 is an enlarged view of a small area of the interleaved threads in the bearing.

The pattern of the braid is graphically illustrated in FIG. 4 and is shown as comprising a plurality of threads 16 and 18 which are criss-crossed in woven relationship with each of threads 16 and 18 alternately passing over and under each other as shown. Each thread 16, 18 follows the form of a helix from one end of the bearing 10 to the other. That is, the threads 16 extend in the form of a helix in one circumferential direction about the bearing 10 and the threads 18 extend in the form of a helix in the opposite circumferential direction about the bearing 10 alternately over and under the threads 16.

Although the threads 16 and 18 are helically braided in the illustrative embodiment of this invention, it will be apparent that the threads may be arranged longitudinally about a cylindrical mandrel to form a tubular shape.

In one working embodiment of the present invention, the size of the tetrafluoroethylene-cotton thread was in the order of thirty to forty gauge, the cotton and tetrafluoroethylene fibers being twisted together in the formation of the thread.

The second lamina 12, which preferably comprises helically braided glass threads, coaxially overlies the tubular lamina 14, the glass threads being braided in the same pattern as shown in FIG. 4. Both the tetrafluoroethylene-cotton threads and the glass threads (laminae 12 and 14) are embedded in an epoxy or polyester resin of the type conventionally used in the fabrication of glass-reinforced plastic fishing rods; however, the resin surrounding the tetrafluoroethylene-cotton threads is filled with finely divided particles of tetrafluoroethylene to form a substantially homogeneous suspension.

In the application of the filled resin, the resin wets and impregnates the cotton fibers but does not wet or impregnate the tetrafluoroethylene fibers. The inner peripheral surface of the lamina 14, therefore, comprises tiny islands of tetrafluoroethylene fibers surrounded and partially embedded in the resin which is filled with microscopic particles of tetrafluoroethylene. The tetrafluoroethylene fibers and particles produce a highly lubricious inner peripheral surface for journalling a shaft. The unfilled resin, i.e., the resin embedding the glass fibers in the lamina 12, does not penetrate inwardly to this inner peripheral surface.

As will now be apparent, the two laminae 12 and 14 are intimately and rigidly bonded together by means of the resin material described above.

The glass threads used in the lamina 12 preferably are of the glass yarn type, each thread being composed of a multiplicity of tiny elongated fibers which, in effect, when bundled together, form the final continuous length of thread. Also, this thread may consist of a plurality of glass strands or threads or still further be in the form of roving without departing from the scope of this invention.

A conventional braiding machine, such as that shown in the Shobert Pat. 3,131,979, can be utilized to braid the threads 16 and 18 about a cylindrical mandrel to form the lamina 14 and then, after the threads 16 and 18 are embedded in the filled resin, to braid glass threads about the lamina 14 to form the lamina 12. The operation of this braiding machine is sufficiently described in the Shobert Pat. 3,131,979 and, therefore, need not be discussed in this description.

In one method of this invention, an elongated, cylindrical mandrel of steel or the like and having a smooth outer surface serves as a molding member onto which the lamina 14 is formed. Preferably, the lamina 14 is applied by means of a braiding machine clearly disposed in Shobert Pat. 3,131,979, among others. The lamina 14 itself is a seamless woven tube of threads 16 and 18 (FIG. 4) the particular form of the weave being a braid described in detail hereinbefore. While the threads 16 and 18 are being applied to the mandrel, they are tensioned such that the resultant seamless tube intimately engages the surface of the mandrel.

Prior to applying the braided lamina 14 to the mandrel, the latter is immersed in a bath of liquid resin material containing finely divided and evenly dispersed tetrafluoroethylene particles. The mandrel is removed from the bath and placed in the braiding machine (see Shobert Pat. 3,131,979) and the threads 16 and 18 are braided onto the mandrel. The wet or liquid resin suspension which coats the mandrel will, of course, be squeezed outwardly through and between the threads 16 and 18 which form the lamina thereby serving to at least partially impregnate the lamina. In one embodiment of this invention, only one woven tube, constituting the lamina 14, consisting of the braided thread 16 and 18, is applied to the mandrel.

In one embodiment, the liquid resin is catalized epoxy for producing a thixotropic material having a high viscosity. The preferred viscosity of the resin material is approximately 500 to 1,000 cps. The tetrafluoroethylene particles are of the size of about one micron or less.

Immediately following the formation of lamina 14, as just described, the assembly including the mandrel is again immersed in the bath of liquid resin suspension, and then agitated sufficiently to ensure thorough impregnation of the lamina 14 and the threads thereof.

The mandrel now would be thoroughly wetted and impregnated lamina 14 is removed from the bath and once again placed in the braiding machine (see Shobert Pat. 3,131,979) for the application of the lamina 12. As previously explained, this lamina 12 includes braided glass being woven by braiding in seamless tubes about the lamina 14. Preferably, several layers of glass braid are applied, one over the other, until a substantial radial thickness in the lamina 12 is built up as is clearly shown in FIGS. 1 and 2. The addition of these layers is accomplished by passing the mandrel through the braiding machine several times in sequence.

When the application of the layers of glass braid has been completed, the entire mandrel and lamina assembly is once again immersed in a bath of liquid resin which, in this instance does not contain the tetrafluoroethylene particles. However, this resin preferably is one of the same composition as that which was used previously to impregnate lamina 14. Once the glass layers have become thoroughly impregnated with the resin, the mandrel with its laminae 12 and 14 is withdrawn from the bath and placed in a conventional curing mold or oven in which all of the resin content is cured and solidified. As a consequence of this curing, the resin in both the laminae 12 and 14, to a certain extent, flow together at least at the interfaces thereby providing a secure bond therebetween. This bond is assured, again at least in part, by reason of the fact that the lamina 14 is wet and the impregnant when the glass braid is applied thereto and then impregnated. The impregnant for the glass braid (lamina 12) soaks through until it merges with the resin and the other portion of the lamina 14. The resin, therefore, is continuous and homogeneous in the portion of the bearing 10 containing laminae or stratra 12 and 14.

In the initial application of the braided thread 16 and 18 to the wetted mandrel, the wrapping force is sufficient to place the thread 16 and 18 into intimate contact with the mandrel surface such that the wet resin is squeezed upwardly past the threads at the points where the tetrafluoroethylene fibers engage the mandrel surface. This assures, then, the inner surface of the lamina 14 has tetrafluoroethylene material sufficiently close to the inner surface of the bearing to provide the necessary lubricity. It should be recognized that the resin material has not wet the tetrafluoroethylene fibers such that the resin, once solidified, becomes a matrix which partially encapsulates and holds the tetrafluoroethylene fibers in place. It will be understood, of course, that the resin does wet the cotton there providing an additional reinforcement for the solidified resin in serving as a matrix for the tetrafluoroethylene fibers. Inasmuch as the resin contains the tetrafluoroethylene particles, a certain number of these will also be exposed at the inner bearing surface to provide additional tetrafluoroethylene in the surface.

The experimentation has shown that by volume, the liquid resin then contained a percentage of Teflon particles ranging from 20% to 50%. By way of upper and lower limits of tetrafluoroethylene content, too much such content will result in destroying the physical, matrix or encapsulating characteristics of the resin thereby leading to dimensional instability of the entrained tetrafluoroethylene. Thus, a low enough concentration of tetrafluoroethylene must be used as will permit retention of the encapsulating, matrix characteristics of the resin whereby the tetrafluoroethylene fibers and particles are securely held in place such that they remain dimensionally stable under load.

If too small an amount of tetrafluoroethylene particles are used, the necessary lubrication qualities in the bearing for dynamic operation are lost.

With respect to the size of the tetrafluoroethylene particles, these preferably are about one micron in diameter or less. However, it will appear to a person skilled in the art, that this size can be varied keeping in mind that if they become too large, the conglomerate of tetrafluoroethylene material will become dimensionally unstable.

While the threads 16 and 18 have been described as being tetrafluoroethylene-cotton, it should be also recognized that material other than cotton may be used so long as it is not interfered with the encapsulating and securing characteristics of the resin.

While the preceding method utilizes an unfilled resin as the impregnant for the lamina 12, yet the same resin suspension for impregnating the lamina 14 may be used for the lamina 12 without departing from the spirit and scope of this invention.

The resultant product, after the lamina 12 is formed, is a self-supporting, hollow tube of resin or plastic material in which the braided laminae and finely divided particles of tetrafluoroethylene are embedded. This finished tube may then have its outer surface ground smooth to a cylindrical shape which is coaxial with the inner peripheral surface of the lamina 14. In connection with providing individual bearing units such as illustrated in FIGS. 1, 2 and 3, the elongated tube formed on the mandrel is cut into short lengths as may be needed for any particular application to which the bearing is to be put.

The bearing of the present invention possesses high compressive strength and dimensional stability because the tetrafluoroethylene in the bearing is surrounded and supported by cotton fibers, glass fibers and the resin material. The cotton acts as a diluent in the tetrafluoroethylene-cotton thread, and by use of braiding only a very thin layer of the thread is applied which not only positions the tetrafluoroethylene fibers where they should be, but also constitutes an economy in the use of an expensive material. By introducing the finely divided particles of tetrafluoroethylene into the resin material about the inner peripheral surface, even greater amounts of tetrafluoroethylene are provided to fill the spaces between the braided tetrafluoroethylene-cotton threads.

Figure 5:
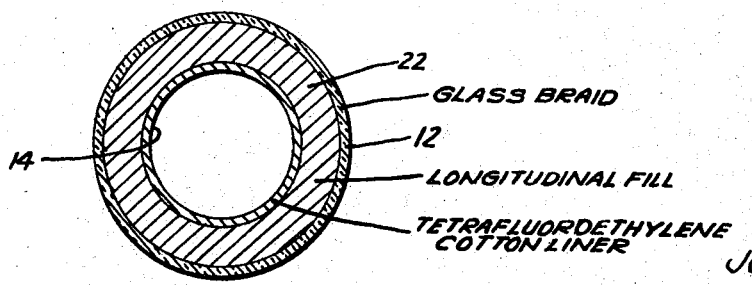
FIG. 5 is a cross-section view of another embodiment of the bearing.

A different embodiment of the bearing is illustrated in FIG. 5 wherein three discrete coaxial laminae are shown. Like numerals indicate like parts.

The inner lamina or liner 14 is the same as that described in connection with FIGS. 1, 2 and 3. However, the second lamina 22 which is coaxially contiguous wtih the liner or lamina 14 is composed of polyester or epoxy resin reinforced by glass thread or yarn which, instead of being braided or interwoven, extends longitudinally of the bearing. There is a sufficient quantity of the glass thread or yarn in this lamina 22 substantially to fill the same with the resin filling the spaces between the fibers of the glass yarn.

Then, on top the lamina 22 is a lamina 12 of glass braid, preferably only a single layer of braid being used.

In the fabrication of this bearing of FIG. 7, the braided lamina 14, is formed precisely as previously explained, a single braided layer of tetrafluoroethylene-cotton being directly braided onto the mandrel. The longitudinally extending glass fibers of the lamina 22 can be applied in an apparatus such as that shown in FIG. 8 of the Shobert Pat. 3,131,979 and by using the method disclosed in that patent.

While there have been described above the principles of this invention in connection with specific apparatus, it is to be clearly understood that this description is made only by way of example and not as a limitation to the scope of the invention.

What is claimed is:

1. A reinforced plastic bearing comprising a resin body having an exposed surface and a plurality of strata, said strata extending generally in the same direction as said surface, said strata including a first stratum adjacent to said exposed surface and including a suspension of finely divided granules of tetrafluoroethylene in said resin, a portion of said granules being exposed at said exposed surface, said resin of said first stratum constituting a matrix which secures said granules in position, said resin being continuous and homogeneous throughout that portion of said body containing said first stratum and the stratum adjacent thereto.

2. The bearing of claim 1 in which the material of said body physically grips and secures said particles without wetting or chemically reacting therewith.

3. The bearing of claim 2 in which the body material is one of the class of epoxy and polyester, said body having embedded therein fibers of reinforcing material.

4. The bearing of claim 3 in which said reinforcing material is glass.

5. The bearing of claim 1 in which said first stratum includes a lamina of threads composed of tetrafluoroethylene and a resin impregnable material, said threads being disposed in said body adjacent to said surface and including the staple fibers of tetrafluoroethylene, said fibers being discontinuous throughout the thread length.

6. The bearing of claim 5 wherein said lamina is tubular in form to provide an inner peripheral surface which is the aforesaid exposed surface, and said threads being woven.

7. The bearing of claim 5 in which said threads are helically braided, a first portion of said threads extending in the form of a helix in one circumferential direction and a second portion of said threads extending in the form of a helix in the opposite circumferential direction alternately over and under said first portion threads, and further comprising in a second stratum a lamina of braided glass fibers disposed in said resin and sheathing said first-mentioned lamina.

8. The bearing of claim 7 in which said resin impregnable material is cotton.

References Cited

UNITED STATES PATENTS

| | | | |
|---|---|---|---|
| 2,614,058 | 10/1952 | Francis | 308—238 |
| 2,885,248 | 5/1959 | White. | |
| 2,998,397 | 8/1961 | Riesing | 308—238 X |
| 3,056,709 | 10/1962 | Riesing. | |
| 3,067,135 | 12/1962 | Strub. | |
| 3,110,530 | 11/1963 | Herman | 308—238 |
| 3,131,979 | 5/1964 | Shobert | 308—238 |
| 3,151,015 | 9/1964 | Griffith. | |
| 3,194,702 | 7/1965 | Geller | 308—238 X |
| 3,243,236 | 3/1966 | Graham | 308—3 |
| 3,250,554 | 5/1966 | Roode | 308—72 X |
| 3,250,556 | 5/1966 | Couch | 308—238 X |

WESLEY S. RATLIFF, JR., Primary Examiner